(12) United States Patent
Kato

(10) Patent No.: US 12,735,653 B2
(45) Date of Patent: Sep. 15, 2026

(54) LUBRICATING OIL COMPOSITION AND SLIDING MECHANISM

(71) Applicant: KYB Corporation, Tokyo (JP)

(72) Inventor: Shinji Kato, Kanagawa (JP)

(73) Assignee: KYB CORPORATION, Tokyo (JP)

(*) Notice: Subject to any disclaimer, the term of this patent is extended or adjusted under 35 U.S.C. 154(b) by 0 days.

(21) Appl. No.: 19/011,965

(22) Filed: Jan. 7, 2025

(65) Prior Publication Data

US 2025/0154427 A1 May 15, 2025

Related U.S. Application Data

(63) Continuation of application No. 17/996,660, filed as application No. PCT/JP2021/016296 on Apr. 22, 2021, now abandoned.

(30) Foreign Application Priority Data

Apr. 24, 2020 (JP) ................................ 2020-077577

(51) Int. Cl.

| | |
|---|---|
| ***C10M 129/74*** | (2006.01) |
| ***C10M 129/76*** | (2006.01) |
| ***C10M 169/04*** | (2006.01) |
| ***F16F 7/09*** | (2006.01) |

(52) U.S. Cl.

CPC ........ *C10M 129/74* (2013.01); *C10M 129/76* (2013.01); *C10M 169/04* (2013.01); *F16F 7/09* (2013.01); *C10M 2207/283* (2013.01)

(58) Field of Classification Search

CPC .............. C10M 129/74; C10M 129/76; C10M 169/04; C10M 2207/283; C10M 2223/045; F16F 7/09; F16C 2361/00; F16C 33/043; F16C 33/109; C10N 2030/06; C10N 2040/08

See application file for complete search history.

(56) References Cited

U.S. PATENT DOCUMENTS

| | | | |
|---|---|---|---|
| 4,312,767 A | 1/1982 | Adams et al. | |
| 6,526,926 B1 * | 3/2003 | Towfighi .................. | B25C 1/08 123/46 R |
| 8,575,076 B2 | 11/2013 | Hamada et al. | |
| 2008/0248981 A1 | 10/2008 | Matsui et al. | |
| 2019/0051437 A1 * | 2/2019 | Komori .................. | H01F 1/447 |

FOREIGN PATENT DOCUMENTS

| | | |
|---|---|---|
| EP | 0286996 A2 | 10/1988 |
| JP | 2005-090738 A | 4/2005 |

OTHER PUBLICATIONS

Nowicki et al., Synthesis of Fatty Acid esters of selected Higher Polyols over Homogeneous Metallic Catalysts, 2016, J Am Oil Chem Soc (2016) 93:973-981 (Year: 2016).*

Hiroshi Nakanishi, "Technical Trends and Tribology of Shock Absorber", Tribologist, vol. 54, No. 9, pp. 598-603, Jan. 13, 2009, with its partial English translation.

* cited by examiner

*Primary Examiner* — Cephia D Toomer
(74) *Attorney, Agent, or Firm* — Rabin & Berdo, P.C.

(57) ABSTRACT

A lubricating oil composition according to the present embodiment is a lubricating oil composition to be used in a sliding member coated with hydrogen-containing diamond-like carbon, and contains a base oil and a friction modifier. The friction modifier contains a fatty acid ester of pentaerythritol.

8 Claims, 1 Drawing Sheet

LUBRICATING OIL COMPOSITION AND SLIDING MECHANISM

CROSS-REFERENCE TO RELATED APPLICATIONS

This application is a continuation of U.S. application Ser. No. 17/996,660 filed on Oct. 20, 2022, which is a U.S. National Stage application of international application No. PCT/JP2021/016296 filed on Apr. 22, 2021. Further, this application claims the benefit of priority of Japanese Patent Application No. 2020-077577 filed in the Japan Patent Office on Apr. 24, 2020. The entire disclosures of these prior International, U.S., and Japanese applications are incorporated herein by reference.

TECHNICAL FIELD

The present invention relates to a lubricating oil composition and a sliding mechanism.

BACKGROUND ART

A damper, which is an example of a sliding mechanism, exerts a vibration suppression force through a reciprocating motion. It is known that the vibration suppression force is a sum of an oil hydraulic damping force generated at a valve and a frictional force generated at a sliding portion between a piston rod and an oil seal or between a piston and a cylinder. It is also known that when the vibration suppression force of the damper is large, steering stability increases, but ride comfort is degraded, and conversely, when the vibration suppression force of the damper is small, the steering stability is degraded, but the ride comfort is improved.

Therefore, a research has been conducted on the damper to adjust the frictional force of the sliding portion by selecting a friction modifier to be added to a lubricating oil applicable to the sliding portion, thereby improving the ride comfort and the steering stability. For example, examples of the friction modifier in the related art include a friction modifier mentioned in "Shock Absorber Technical Trends and Tribology (Hiroshi Nakanishi, Tribologist 2009 (Vol. 54) No. 9, p598)".

SUMMARY OF INVENTION

In recent years, a technique for coating a portion under a severe friction and wear environment with a hard thin film material has been applied widely as a surface treatment technique for the portion. Diamond-like carbon (hereinafter referred to as "DLC"), which is an example of such a coating material, has an excellent low-friction property and is widely applied as a low-friction sliding member.

However, it is well known that a lubricating oil composition containing a friction modifier in the related art does not sufficiently exhibit a friction adjustment effect on a DLC coating material. In particular, for a hydrogen-containing DLC coating material, it is more difficult to set an effective friction modifier and lubricating oil composition, and it is difficult to improve the friction property.

The present invention has been made in view of the above problem, and an object of the present invention is to improve the friction property of a sliding mechanism that includes a sliding member coated with hydrogen-containing diamond-like carbon.

An aspect of the present invention is summarized as the following lubricating oil composition.

A lubricating oil composition to be used in a sliding member coated with hydrogen-containing diamond-like carbon contains a base oil and a friction modifier. The friction modifier contains a fatty acid ester of pentaerythritol.

DESCRIPTION OF EMBODIMENTS

Lubricating Oil Composition

Figure 1:
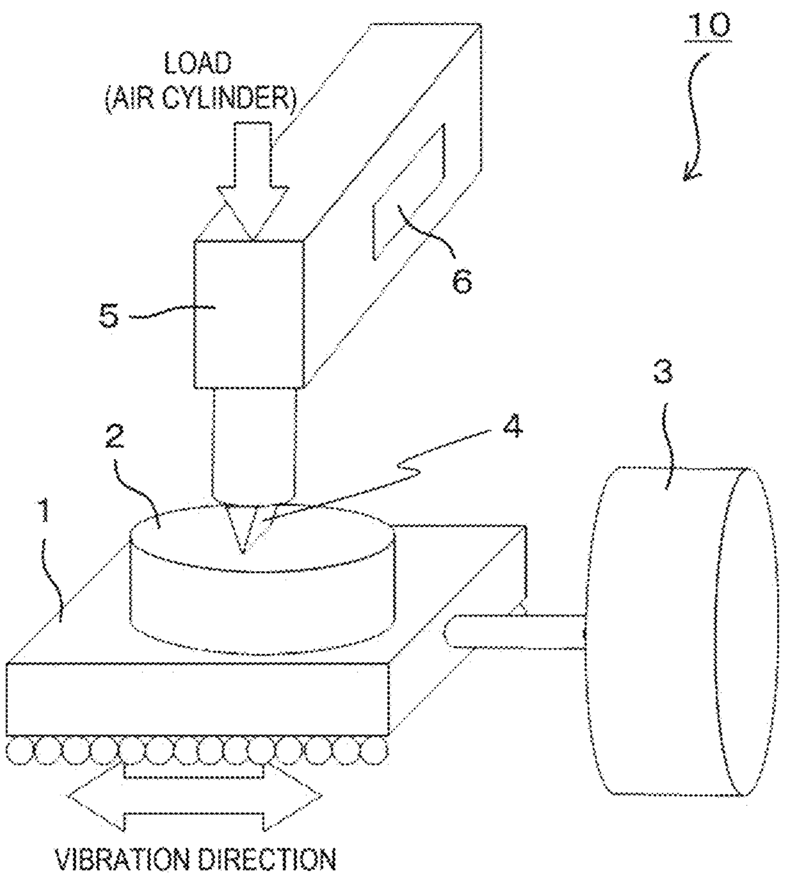
FIG. 1 is a schematic diagram illustrating a device for measuring a normal dynamic friction coefficient and a minute low speed friction coefficient.

Hereinafter, a lubricating oil composition according to an embodiment of the present invention will be described.

The lubricating oil composition according to the present embodiment is a lubricating oil composition to be used in a sliding member coated with hydrogen-containing diamond-like carbon (hereinafter referred to as "hydrogen-containing DLC"), and contains (A) a base oil and (B) a friction modifier. The (B) friction modifier contains a fatty acid ester of pentaerythritol.

(A) Base Oil

In the lubricating oil composition according to the present embodiment, the base oil is a mineral oil and/or a synthetic oil. The type of the mineral oil or the synthetic oil is not particularly limited, and examples of the mineral oil include a paraffinic mineral oil, an intermediate base mineral oil, and a naphthenic mineral oil which are obtained by an ordinary refinement method such as solvent refinement and hydrogenation refinement. Examples of the synthetic oil include polybutene, a polyolefin (α-olefin (co)polymer), various esters (such as a polyol ester, a dibasic acid ester, and a phosphate ester), various ethers (such as polyphenyl ether), alkylbenzene, and alkylnaphthalene.

In the present embodiment, as the base oil, one type of the mineral oil may be used, or two or more types of the mineral oils may be used in combination. In addition, one type of the synthetic oil may be used, or two or more types of the synthetic oils may be used in combination. Further, one or more types of mineral oils and one or more types of synthetic oils may be used in combination.

(B) Friction Modifier

The lubricating oil composition according to the present embodiment contains the fatty acid ester of pentaerythritol as the friction modifier. As the fatty acid ester of pentaerythritol, one having a fatty acid residue having 10 or more and 20 or less carbon atoms can be used. The fatty acid residue is a decarboxylated residue of a fatty acid, and may be a branched or linear fatty acid. The fatty acid residue may be an unsaturated or saturated aliphatic hydrocarbon group.

Pentaerythritol is a tetravalent sugar alcohol. Examples of fatty acid ester of pentaerythritol include a pentaerythritol tetraester in which all of four terminal substituents are ester-bonded to fatty acid residues, and a pentaerythritol monoester, a pentaerythritol diester, and a pentaerythritol triester in which any of the terminal substituents is ester-bonded to the fatty acid residue.

In the present embodiment, as the friction modifier, a plurality of esters selected from the pentaerythritol monoester, the pentaerythritol diester, the pentaerythritol triester, and the pentaerythritol tetraester described above may be mixed and used.

In the present embodiment, it is presumed, as a factor that enables the friction adjustment for the sliding member coated with hydrogen-containing DLC, that a terminal hydroxy group is dominant than the fatty acid residues constituting the fatty acid ester of pentaerythritol. Therefore, it is preferable to use a partial ester of pentaerythritol whose hydroxyl value is higher. In the present embodiment, pentaerythritol monooleate can be used, but the number of carbon atoms in the fatty acid residue is not limited to C18.

In the present embodiment, a content of the fatty acid ester of pentaerythritol as the (B) friction modifier can be 0.2% by mass or more and 10.0% by mass or less with respect to a total amount of the lubricating oil composition. When a content of the (B) friction modifier is less than 0.2% by mass, a friction adjustment effect on the hydrogen-containing DLC coating material cannot be achieved, and when the content exceeds 10.0% by mass, the friction adjustment effect reaches a peak, leading to a loss in material costs.

Specifically, in the present embodiment, when a total hydroxyl value of the fatty acid ester of pentaerythritol in the friction modifier is 2.20 mgKOH/g or more, it is possible to achieve the friction adjustment effect on the sliding member coated with hydrogen-containing DLC.

Therefore, the friction modifier according to the present embodiment may contain a pentaerythritol tetraester whose ester value is 4. In this case, the friction modifier is used in combination with the pentaerythritol monoester or the like whose hydroxyl value is high to adjust the total hydroxyl value of the fatty acid ester of pentaerythritol to the above specific value.

The friction modifier applicable in the present embodiment may contain various friction reducing agents such as a phosphorus-based friction reducing agent, an amine-based friction reducing agent, or an ester-based friction reducing agent, in addition to those described above. A friction coefficient of the sliding member in a sliding mechanism to which the lubricating oil composition is applied can be adjusted by adjusting an addition amount of these friction reducing agents.

(C) Zinc Dithiophosphate (ZnDTP)

In the present embodiment, in order to assist in the adjustment of the friction coefficient by the (B) friction modifier described above, a phosphorus-containing compound whose chemical structure represented by the following General Formula (1) may be contained. Each R in General Formula (1) represents an individual hydrocarbon group, and examples thereof include a linear primary alkyl group, a branched secondary alkyl group, or an aryl group. In the present embodiment, R is not particularly limited, and preferably has one or more secondary alkyl groups having at least a short chain (3 to 5 carbon atoms).

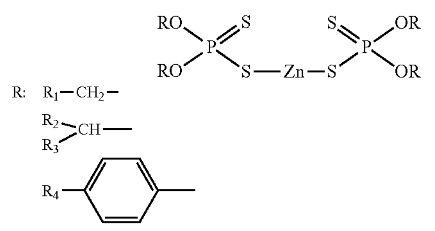

(1)

In the present embodiment, ZnDTPs having different numbers of alkyl groups can be mixed and used as the ZnDTP. In this case, an average number of the alkyl groups in the ZnDTP is preferably 1 to 3, and more preferably 1 to 2. A method for measuring the average number of the alkyl groups in the ZnDTP is not particularly limited, and the average number can be determined by measuring the hydroxyl value by using an FT-IR, for example.

The ZnDTP according to the present embodiment preferably has at least a secondary alkyl group, and more preferably has the secondary alkyl group in an amount larger than a primary alkyl group. In the present embodiment, different types of ZnDTPs can be mixed. In this case, it is preferable to contain the ZnDTP having at least a secondary alkyl group, and it is preferable that the ZnDTP as a whole has the secondary alkyl group in an amount larger than a primary alkyl group. An alkyl group having a short chain is more preferable than an alkyl group having a long chain. Therefore, the ZnDTP according to the present embodiment has a secondary alkyl group having at least a short chain (3 to 5 carbon atoms). A method for measuring the alkyl group in the ZnDTP is not particularly limited, and measurement regarding whether the alkyl group is a primary alkyl group or a secondary alkyl group, or whether the alkyl group has a short chain or a long chain can be made based on characteristics of an absorption band of P—O—C and an absorption band of P═SP—S using a fingerprint region in the FT-IR, for example.

It is easy to adjust the friction coefficient according to an addition amount of the friction modifier when the ZnDTP is added.

Function and Effect

The lubricating oil composition according to the present embodiment is a lubricating oil composition to be used in the sliding member coated with hydrogen-containing diamond-like carbon, contains the base oil and the friction modifier, and contains the fatty acid ester of pentaerythritol as the friction modifier. Such a lubricating oil composition enables the friction adjustment for the sliding mechanism that includes the sliding member coated with the hydrogen-containing DLC coating material and for which friction adjustment is difficult in the related art.

In a damper, a constant time is required from rise of an oil hydraulic damping force for providing a vibration suppression force to start of a vibration suppression function. In response to this, the frictional force has high responsiveness. Therefore, during a period until the oil hydraulic damping force rises, that is, a period during which the sliding member shifts from a stationary state to a slipping state, or in a slight amplitude time during which the oil hydraulic damping force hardly acts, the frictional force becomes an important factor of the vibration suppression force of the damper.

The inventor of the present invention has focused on a matter that, in the sliding member, a friction coefficient during the period until the oil hydraulic damping force rises or in slight vibration during which the oil hydraulic damping force hardly acts (referred to as a "minute low speed friction coefficient"), and a friction coefficient in normal vibration during which the oil hydraulic damping force acts (referred to as a "normal dynamic friction coefficient") are different from each other, and has found that the difference in the friction property influences performance of the damper. It is also found that it is possible to achieve both steering stability and ride comfort by setting a ratio of the normal dynamic friction coefficient to the minute low speed friction coefficient within a specific numerical range.

In the present embodiment, as an example, the normal dynamic friction coefficient is a friction coefficient when the damper as the sliding member is vibrated at a predetermined amplitude and a sliding speed of more than 4.0 mm/s. The minute low speed friction coefficient is a friction coefficient when the damper is vibrated at a predetermined amplitude and a sliding speed of 0.20 mm/s or less.

The ratio of the normal dynamic friction coefficient to the minute low speed friction coefficient can be set to a specific numerical range by applying the lubricating oil composition according to the present embodiment to the sliding member coated with the hydrogen-containing DLC coating material.

More specifically, when the lubricating oil composition according to the present embodiment is applied to a damper that includes the sliding member coated with the hydrogen-containing DLC coating material, a value of (normal dynamic friction coefficient)/(minute low speed friction coefficient) can be brought close to 1.

The value of (normal dynamic friction coefficient)/(minute low speed friction coefficient) of 1 means that the friction coefficient is constant regardless of the sliding speed of the sliding member, and the value of less than 1.20 means that a variation in the friction coefficient can be reduced with respect to a change in the sliding speed of the sliding member. The value of normal dynamic friction coefficient)/(minute low speed friction coefficient) of less than 1 means that the frictional force at a minute low speed is large, and the frictional force at a normal time is small.

Accordingly, when the lubricating oil composition according to the present embodiment is applied to, for example, a shock absorber as a damper, the vibration can be suppressed by the frictional force at an initial stage of movement of a piston, which is a stage before an oil hydraulic force for suppressing the vibration is generated. Therefore, with the lubricating oil composition according to the present embodiment, it is possible to easily set the oil hydraulic damping force of the damper using a shock absorbing member coated with hydrogen-containing DLC.

In the present embodiment, when the value of (normal dynamic friction coefficient)/(minute low speed friction coefficient) is about 0.4, it is possible to achieve a vibration reduction effect in the stage before the oil hydraulic force for suppressing the vibration is generated.

In the lubricating oil composition according to the present embodiment, as the fatty acid ester of pentaerythritol, one having a fatty acid residue having 10 or more and 20 or less carbon atoms can be used. In addition, in the lubricating oil composition according to the present embodiment, it is preferable to use a partial ester of pentaerythritol having 1 to 3 hydroxy groups from a viewpoint of setting the total hydroxyl value of the fatty acid ester of pentaerythritol to an appropriate value. Further, in the lubricating oil composition according to the present embodiment, pentaerythritol monooleate can be used as an example of the partial ester of pentaerythritol.

According to these characteristics, the value of (normal dynamic friction coefficient)/(minute low speed friction coefficient) can be brought close to 1.

When the lubricating oil composition according to the present embodiment contains 0.2% by mass or more of the fatty acid ester of pentaerythritol, it is possible to achieve the friction adjustment effect on the hydrogen-containing DLC coating material.

Further, in the present embodiment, when the total hydroxyl value of the fatty acid ester of pentaerythritol in the friction modifier is 2.20 mgKOH/g or more, it is possible to achieve the friction adjustment effect on the sliding member coated with hydrogen-containing DLC.

The lubricating oil composition according to the present embodiment may further contain a phosphorus-containing compound. The lubricating oil composition according to the present embodiment can reduce the difference between the minute low speed friction coefficient and the normal dynamic friction coefficient by containing the phosphorus-containing compound. Accordingly, it is possible to easily adjust the friction coefficient to a friction coefficient suitable for the ride comfort and the steering stability.

Among the phosphorus-containing compound, particularly a ZnDTP is suppressed from being deteriorated (decomposed) by pentaerythritol, and thus the adjusted frictional force can be maintained over a long period of time.

Therefore, the lubricating oil composition according to the present embodiment enables the friction adjustment for the sliding mechanism that includes the sliding portion coated with the hydrogen-containing DLC coating material.

The lubricating oil composition according to the present embodiment is suitable as a lubricating oil used for, in addition to the damper, an internal combustion engine, a driving system transmission machine, industrial equipment, metal processing, and the like to which a low-friction sliding member coated with the hydrogen-containing DLC coating material as a hard thin film material is applied.

Sliding Mechanism

A sliding mechanism according to the present embodiment is a sliding mechanism using the lubricating oil composition according to the present embodiment described above, and includes at least a sliding portion coated with hydrogen-containing DLC. Examples of the sliding mechanism according to the present embodiment include a piston rod, a cylinder, a gear, a bearing, a transmission, and a damper to which the low-friction sliding member coated with the hydrogen-containing DLC coating material as the hard thin film material is applied.

By applying the lubricating oil composition described above to the sliding mechanism according to the present embodiment, it is possible to perform the friction adjustment which is difficult in the sliding mechanism coated with the hydrogen-containing DLC coating material. When the sliding mechanism according to the present embodiment is a damper, it is possible to improve durability to friction and wear by coating the sliding portion with the hydrogen-containing DLC coating material, and it is possible to achieve both the ride comfort and the steering stability at a high level.

Therefore, when the lubricating oil composition according to the present embodiment is applied to a damper, the value of (normal dynamic friction coefficient)/(minute low speed friction coefficient) among components constituting the oil hydraulic damping force of the damper can be brought close to 1 regardless of the speed. Accordingly, it is possible to easily set the oil hydraulic damping force of the damper. Therefore, it is possible to design a damper capable of achieving both the steering stability and the ride comfort.

EXAMPLES

Hereinafter, the present invention will be described in more detail with reference to examples and comparative examples, but the present invention is not limited to these examples.

Method for Measuring Normal Dynamic Friction Coefficient and Minute Low Speed Friction Coefficient FIG. 1 is a schematic view illustrating a device that measures the normal dynamic friction coefficient and the minute low speed friction coefficient. In the present example, the normal dynamic friction coefficient and the minute low speed friction coefficient of a test specimen are measured using a friction testing device 10 shown in FIG. 1.

Friction Testing Device

The friction testing device 10 shown in FIG. 1 is a pin-on-disk type friction testing device. The friction testing device 10, a frictional force generated by reciprocating, by an electromagnetic oscillator 3, a disk-shaped test piece 2 fixed on a slide bearing 1, and pressing and sliding a pin-shaped test piece 4 on the disk-shaped test piece 2 is measured using a strain gauge 6 attached to a fixed shaft 5 of the pin-shaped test piece 4.

In the friction testing device 10 shown in FIG. 1, acrylonitrile-butadiene rubber (NBR) used as an oil seal in a damper is used as the pin-shaped test piece 4.

A tip of the pin-shaped test piece 4 is cut so as to have an angle of 140° imitating an oil lip shape. The disk-shaped test piece 2 is coated with hydrogen-containing diamond-like carbon used for a surface of a piston rod and is polished to a surface roughness Ra of 0.01 μm or less.

The frictional force (friction coefficient) between the pin-shaped test piece 4 of NBR and the disk-shaped test piece 2 coated with hydrogen-containing diamond-like carbon is measured using this device.

Measurement of Normal Dynamic Friction Coefficient and Minute Low Speed Friction Coefficient Measurement of the normal dynamic friction coefficient and measurement of the minute low speed friction coefficient are performed. Regarding the measurement of the normal dynamic friction coefficient, the measurement is performed under conditions of an amplitude of 5.0 mm, a frequency of 5.0 Hz, and a sliding speed of 4.0 mm/s in a friction test using the friction testing device 10 shown in FIG. 1. Regarding the minute low speed friction coefficient, the measurement is performed under conditions of an amplitude of 5.0 mm, a frequency of 5.0 Hz, and a sliding speed of 0.20 mm/s.

Calculation of Amplitude Dependent Index

In the present embodiment, an amplitude dependent index is an index adopted for evaluating the lubricating oil composition according to the present embodiment, and can be treated as one of evaluation indices for the ride comfort of the damper. The amplitude dependent index is expressed by (normal dynamic friction coefficient)/(minute low speed friction coefficient). As the amplitude dependent index is closer to 1, the difference between the friction coefficient at the time of the slight amplitude and the friction coefficient at the time of the normal amplitude is small, and it is possible to evaluate that the ride comfort is excellent.

Stick-Slip Evaluation

In the measurement of the normal dynamic friction coefficient or the minute low speed friction coefficient, stick-slip is evaluated as "Yes" when the stick-slip occurred, and oil bleeding and deterioration in lip durability occurred. The amplitude dependent index and the stick-slip evaluation are integrated to determine whether the lubricating oil composition is passed or failed. A lubricating oil composition with a pass level is indicated by "G" and a lubricating oil composition with a failure level is indicated by "F".

Examples, Comparative Examples, and Reference Examples

Test specimens of lubricating oil compositions of examples, comparative examples and reference examples are prepared according to compositions shown in Table 1.

Examples

In a group of examples, there are provided lubricating oil compositions whose total hydroxyl values are different by changing a mixing ratio of fatty acid esters of pentaerythritol whose ester values are different or using a fatty acid ester of pentaerythritol alone, as a composition of the friction modifier in the lubricating oil composition. An oleate having a fatty acid residue having a carbon number of C18 was used as the fatty acid ester of pentaerythritol. A mineral oil was used as the base oil. If necessary, zinc dithiophosphate (ZnDTP) was used as the friction modifier.

A friction test using acrylonitrile-butadiene rubber (NBR) as the pin-shaped test piece 4, and a material coated with hydrogen-containing diamond-like carbon (DLC) as the disk-shaped test piece 2 was performed in the friction testing device 10 shown in FIG. 1 using these lubricating oil compositions.

Comparative Examples

In Comparative Example 1 of a group of comparative examples, a pentaerythritol tetraester is used, and a material coated with hydrogen-free DLC is used as the test piece 2 in the friction testing device 10. In Comparative Example 2, a pentaerythritol tetraester is used, and the material coated with hydrogen-containing DLC is used as the test piece 2 in the friction testing device 10.

In Comparative Example 3, a lubricating oil composition containing only a mineral oil and not containing a fatty acid ester of pentaerythritol is applied to the friction testing device 10 using the material coated with hydrogen-free DLC as the test piece 2. In Comparative Example 4, the lubricating oil composition containing only a mineral oil and not containing a fatty acid ester of pentaerythritol is applied to the friction testing device 10 using the material coated with hydrogen-containing DLC as the test piece 2.

Reference Examples

In a group of reference examples, lubricating oil compositions in Examples 1 and 7 are applied to a material coated with hydrogen-free diamond-like carbon (DLC) in the friction testing device 10 shown in FIG. 1.

Evaluation Results

Evaluation results are shown in Table 1.

TABLE 1

| | | Example | | | | | | | Comparative Example | | | | Reference Example | |
|---|---|---|---|---|---|---|---|---|---|---|---|---|---|---|
| | | 1 | 2 | 3 | 4 | 5 | 6 | 7 | 1 | 2 | 3 | 4 | 1 | 2 |
| Composition (% by mass) | Pentaerythritol (mono-) | 1.0 | 0 | 0 | 2.0 | 6.0 | 0 | 10.0 | 0 | 0 | 0 | 0 | 1.0 | 10.0 |
| | Pentaerythritol (di-) | 0 | 2.0 | 6.0 | 0 | 0 | 0 | 0 | 0 | 0 | 0 | 0 | 0 | 0 |
| | Pentaerythritol (tri-) | 0 | 0 | 0 | 0 | 0 | 6.0 | 0 | 0 | 0 | 0 | 0 | 0 | 0 |
| | Pentaerythritol (tetra-) | 9.0 | 0 | 0 | 4.0 | 0 | 0 | 0 | 10.0 | 10.0 | 0 | 0 | 9.0 | 0 |
| | Zn-DTP | 0 | 1.0 | 0 | 0 | 0 | 0 | 0 | 0 | 0 | 0 | 0 | 0 | 0 |
| | Base oil | 90 | 97 | 94 | 94 | 94 | 94 | 90 | 90 | 90 | 100 | 100 | 90 | 90 |
| | Total hydroxyl value (mgKOH/g) | 2.22 | 2.32 | 5.10 | 2.20 | 4.68 | 3.78 | 18.8 | 1.6 | 1.6 | 0 | 0 | 2.22 | 18.8 |
| Type of coating film | Hydrogen-containing DLC | ○ | ○ | ○ | ○ | ○ | ○ | ○ | — | ○ | — | ○ | — | — |
| | Hydrogen-free DLC | — | — | — | — | — | — | — | ○ | — | ○ | — | ○ | ○ |
| Evaluation result | Minute low speed friction coefficient (A) | 0.114 | 0.065 | 0.062 | 0.061 | 0.054 | 0.062 | 0.093 | 0.274 | 0.250 | 0.320 | 0.315 | 0.099 | 0.094 |
| | Normal dynamic friction coefficient (B) | 0.050 | 0.060 | 0.060 | 0.060 | 0.060 | 0.07 | 0.05 | 0.120 | 0.070 | 0.390 | 0.380 | 0.050 | 0.050 |
| | B/A | 0.455 | 0.997 | 1.030 | 1.003 | 1.076 | 1.073 | 0.519 | 0.434 | 0.280 | 1.223 | 1.218 | 0.495 | 0.535 |
| | Stick-slip | No | No | No | No | No | No | No | Yes | Yes | Yes | Yes | No | No |
| | Comprehensive determination | G | G | G | G | G | G | G | F | F | F | F | G | G |

According to Examples 1 and 10, and Reference Examples 1 and 2, it is clear that the lubricating oil composition containing the fatty acid ester of pentaerythritol can achieve an effect of reducing the friction coefficient of the material coated with hydrogen-containing DLC, whose friction coefficient is difficult to be adjusted up to now, in the same manner as the material coated with hydrogen-free DLC.

It is clear from comparison between Examples 1 to 7 and Comparative Examples 1 and 2 that when the total hydroxyl value of the lubricating oil composition is about 1.6 mgKOH/g, for both the material coated with hydrogen-containing DLC and the material coated with hydrogen-free DLC, the value of (normal dynamic friction coefficient)/(minute low speed friction coefficient) can be brought close to the extent that the vibration reduction effect is achieved in the stage before the oil hydraulic force for suppressing the vibration is generated, but the stick-slip is likely to occur, and the lubricating oil composition is practically inapplicable when mounted on a predetermined shock absorber.

According to Examples 1 to 7, it is clear that when the total hydroxyl value of the lubricating oil composition is 2.20 mgKOH/g or more, the value of (normal dynamic friction coefficient)/(minute low speed friction coefficient) can be brought close to 0.4 to 1, and when the lubricating oil composition is applied to a damper, the vibration reduction effect can be achieved without causing the stick-slip in the stage before the oil hydraulic force for suppressing the vibration is generated.

Conclusion

A configuration, functions, and effects of the embodiment of the present invention configured as described above will be collectively described.

A lubricating oil composition according to the present embodiment is a lubricating oil composition to be used in a sliding member coated with hydrogen-containing diamond-like carbon (DLC), contains a base oil and a friction modifier, and contains a fatty acid ester of pentaerythritol as the friction modifier.

The lubricating oil composition enables friction adjustment for a sliding mechanism that includes the sliding member coated with the hydrogen-containing DLC coating material and for which friction adjustment is difficult in the related art. Therefore, the lubricating oil composition can improve the friction property of the sliding member coated with the hydrogen-containing DLC coating material.

With the lubricating oil composition, a ratio of a normal dynamic friction coefficient to a minute low speed friction coefficient can be set to a specific numerical range. More specifically, when the lubricating oil composition according to the present embodiment is applied to a damper that includes the sliding member coated with the hydrogen-containing DLC coating material, a value of (normal dynamic friction coefficient)/(minute low speed friction coefficient) can be brought close to 1.

It is presumed that in the lubricating oil composition according to the present embodiment, the terminal hydroxy group in pentaerythritol contributes to the sliding member coated with hydrogen-containing DLC. Therefore, in the present embodiment, when the total hydroxyl value of the fatty acid ester of pentaerythritol as the friction modifier is 2.20 mgKOH/g or more, it is possible to achieve the friction adjustment effect on the sliding member coated with hydrogen-containing DLC.

The lubricating oil composition according to the present embodiment further contains a phosphorus-containing compound.

The lubricating oil composition according to the present embodiment can reduce a difference between the minute low speed friction coefficient and the normal dynamic friction coefficient by containing the phosphorus-containing compound. Accordingly, it is possible to easily adjust the friction coefficient to a friction coefficient suitable for ride comfort and steering stability.

In the lubricating oil composition according to the present embodiment, the phosphorus-containing compound is zinc dithiophosphate (Zn-DTP), and has at least a secondary alkyl group having 3 to 5 carbon atoms.

Among the phosphorus-containing compound, particularly a Zn-DTP is suppressed from being deteriorated (decomposed) by pentaerythritol, and thus the adjusted frictional force can be maintained over a long period of time.

A sliding mechanism according to the present embodiment is a sliding mechanism using the lubricating oil composition described above, and includes at least a sliding portion coated with hydrogen-containing DLC.

In such a sliding mechanism, the friction adjustment can be performed by the lubricating oil composition containing the fatty acid ester of pentaerythritol, and (normal dynamic friction coefficient)/(minute low speed friction coefficient) can be brought close to 1.

When such a sliding mechanism is, for example, a damper, it is possible to design a damper capable of achieving the vibration reduction effect in a stage before an oil hydraulic force for suppressing vibration is generated. Accordingly, it is possible to expand a design width of the oil hydraulic damping force of the damper, and it is possible to design a damper capable of achieving both the steering stability and the ride comfort.

Other Embodiments

Although the embodiment of the present invention has been described above, the above embodiment is merely a part of application examples of the present invention, and is not intended to limit the technical scope of the present invention to the specific configurations of the above embodiment.

In the lubricating oil composition according to the present embodiment, in addition to the components described above, at least one component selected from an ashless detergent dispersant, a metal-based detergent, a lubricity improver, an antioxidant, a rust inhibitor, a metal deactivator, a viscosity index improver, a pour point depressant, and an antifoaming agent can be appropriately blended as an optional component as long as the object of the present invention is not impaired. In addition to the optional component described above, a component that can be used as an additive of the lubricating oil composition for the damper can be appropriately blended.

The present application claims priority under Japanese Patent Application No. 2020-77577 filed to the Japan Patent Office on Apr. 24, 2020, and the entire content of this application is incorporated herein by reference.

The invention claimed is:

1. A damper, comprising:
- a piston rod coated with a hydrogen-containing diamond-like carbon;
- a rubber oil seal slidably contacting the piston rod; and
- a lubricating oil composition applied between the piston rod and the rubber oil seal to lubricate a motion of the piston rod while a damping force and a friction force are generated, the lubricating oil composition including:
  - a base oil; and
  - a friction modifier containing a fatty acid ester of pentaerythritol that is a pentaerythritol monoester or a pentaerythritol diester and is in a range of 0.2 mass % to 6.0 mass % of a total mass of the lubricating oil, wherein
  - a total hydroxyl value of the fatty acid ester of pentaerythritol is 2.20 mgKOH/g or more.

2. The damper according to claim 1, wherein the lubricating oil composition contains the fatty acid ester of pentaerythritol in an amount greater than 2.0 mass % and equal to or less than 6.0 mass % thereof.

3. The damper according to claim 1, wherein a surface roughness Ra of the piston rod is 0.01 μm or less.

4. The damper according to claim 1, wherein the rubber oil seal is made of acrylonitrile-butadiene rubber (NBR).

5. The damper according to claim 1, wherein the fatty acid ester of pentaerythritol is a plurality of esters selected from a pentaerythritol monoester, a pentaerythritol diester, a pentaerythritol triester, and a pentaerythritol tetraester.

6. The damper according to claim 1, wherein the base oil included in the lubricating oil composition is a mineral oil.

7. The damper according to claim 1, wherein the friction modifier is so selected and applied that a ratio of a first friction coefficient to a second friction coefficient is less than 1.20, wherein
- the first friction coefficient is a dynamic friction coefficient while the piston rod moves at a first speed to generate a required dumping force, and
- the second dynamic friction coefficient is a friction coefficient obtained while the piston rod moves at a second speed less than the first speed.

8. The damper according to claim 7, wherein the first speed is greater than 4.0 mm/s and the second speed is less than 0.20 mm/s.

* * * * *